United States Patent
Maldei et al.

(10) Patent No.: US 8,606,982 B2
(45) Date of Patent: Dec. 10, 2013

(54) DERIVATIVE LOGICAL OUTPUT

(75) Inventors: Michael Maldei, Durham, NC (US);
Petra Stumm, Durham, NC (US)

(73) Assignee: Qimonda AG, Munich (DE)

( * ) Notice: Subject to any disclaimer, the term of this patent is extended or adjusted under 35 U.S.C. 154(b) by 627 days.

(21) Appl. No.: 12/045,369

(22) Filed: Mar. 10, 2008

(65) Prior Publication Data

US 2009/0228624 A1 Sep. 10, 2009

(51) Int. Cl.
*G06F 13/14* (2006.01)

(52) U.S. Cl.
USPC ............................................ 710/305

(58) Field of Classification Search
USPC ............................................ 710/305
See application file for complete search history.

(56) References Cited

U.S. PATENT DOCUMENTS

| | | | |
|---|---|---|---|
| 6,553,445 B1 * | 4/2003 | Drapkin et al. | 710/305 |
| 6,946,867 B2 * | 9/2005 | Naganawa | 326/27 |
| 7,154,300 B2 * | 12/2006 | Anders et al. | 326/86 |
| 7,684,231 B2 * | 3/2010 | Hayashi et al. | 365/154 |
| 2001/0027504 A1 * | 10/2001 | Devanney et al. | 710/129 |
| 2002/0071331 A1 * | 6/2002 | Al-Shamma et al. | 365/227 |
| 2003/0099300 A1 * | 5/2003 | Anders et al. | 375/259 |
| 2005/0132112 A1 * | 6/2005 | Pawlowski | 710/110 |
| 2009/0089557 A1 * | 4/2009 | Luo et al. | 712/224 |
| 2009/0182918 A1 * | 7/2009 | Hollis | 710/106 |

* cited by examiner

*Primary Examiner* — Nimesh G Patel
(74) *Attorney, Agent, or Firm* — Patterson & Sheridan, LLP

(57) ABSTRACT

Embodiments of the invention are related to methods, systems, and articles of manufacture for transferring data between two devices using an interconnect bus. On each conductive line of the bus, a bit representing a first logic state is transferred if a current bit is the same as an immediately previously transmitted bit. If the current bit is different from the immediately previously transmitted bit, then a bit representing a second logic state is transferred.

26 Claims, 5 Drawing Sheets

| PREVIOUS BIT | CURRENT BIT | DERIVED BIT |
|---|---|---|
| 0 | 0 | 1 |
| 0 | 1 | 0 |
| 1 | 0 | 0 |
| 1 | 1 | 1 |

|     | RECEIVED BITS | DBI DC | | DERIVED BITS | DERIVED BITS + DBI DC | |
| --- | --- | --- | --- | --- | --- | --- |
| 841 |  | ENABLE BIT | |  | ENABLE BIT | |
| 842 | 0100 | 1011 | 0 | 1011 | 1011 | 1 |
| 843 | 0100 | 1011 | 0 | 1111 | 1111 | 1 |
| 844 | 0110 | 0110 | 1 | 1101 | 1101 | 1 |
| 845 | 1000 | 0111 | 0 | 0001 | 1110 | 0 |
| 846 | 1100 | 1100 | 1 | 1011 | 1011 | 1 |
| 847 | 1110 | 1110 | 1 | 1101 | 1101 | 1 |
| 848 | 1111 | 1111 | 1 | 1110 | 1110 | 1 |
| TOTAL 0's | 14 | 8 + 3 = 11 | | 8 | 6 + 1 = 7 | |

*Fig. 8*

|  | RECEIVED BITS | DERIVED BITS |
| --- | --- | --- |
|  |  | (0000) |
|  | 0000 | 1111 |
|  | 0000 | 1111 |
|  | 0000 | 1111 |
|  | 0001 | 1110 |
|  | 0001 | 1111 |
|  | 0001 | 1111 |
|  | 0011 | 1101 |
|  | 0011 | 1111 |
|  | 0000 | 1100 |
|  | 0001 | 1110 |
| TOTAL 0's | 32 | 5 |

*Fig. 9*

DERIVATIVE LOGICAL OUTPUT

BACKGROUND OF THE INVENTION

Modern electronic devices generally contain one or more devices that communicate with each other over a bus. For example, a computer generally comprises a processor or memory controller that communicates with a memory device over a bus to access programs and data contained in the memory device. The performance of modern electronic devices such as processors and memories continues to improve by operating the devices at higher clock speeds and/or widening the bus connecting the devices. Increasing clock speed and widening the bus, however, result in increased power consumption by the bus. Furthermore, the toggling of bits on the bus during sequential data transmissions may generate noise on the bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates an exemplary table illustrating actual, inverted and derived bits according to an embodiment of the invention.

FIG. 9 illustrates another exemplary table illustrating derived bits according to an embodiment of the invention.

DETAILED DESCRIPTION OF THE PREFERRED EMBODIMENT

Figure 1:
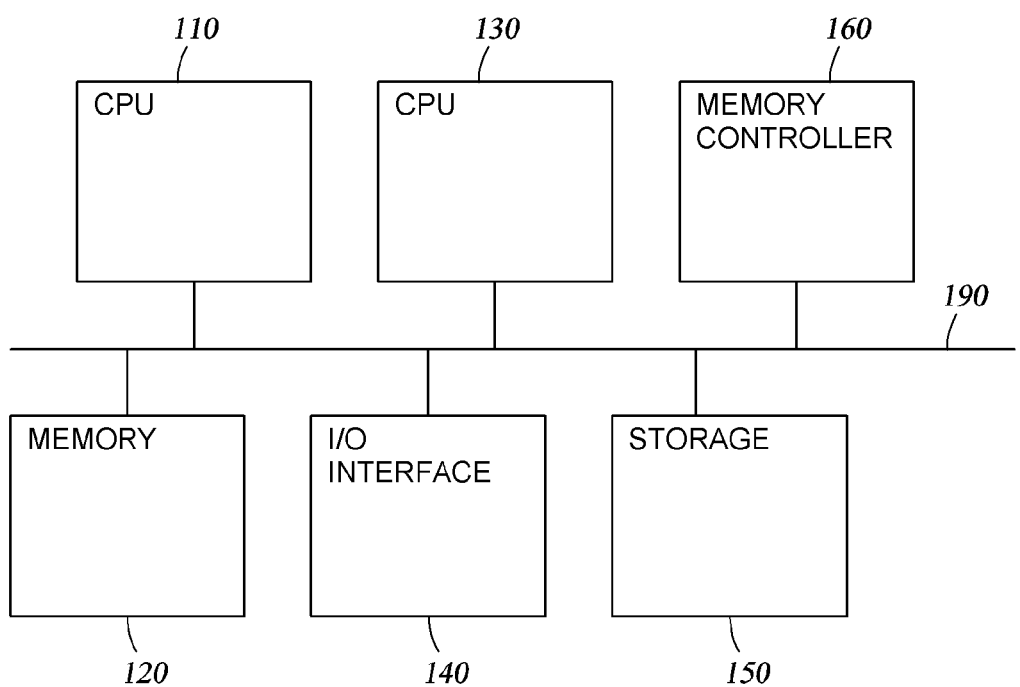
FIG. 1 illustrates an exemplary system according to an embodiment of the invention.

Embodiments of the invention are related to methods, systems, and articles of manufacture for transferring data between two devices using an interconnect bus. On each conductive line of the bus, a bit representing a first logic state is transferred if a current bit is the same as an immediately previous bit. If the current bit is different from the immediately previous bit, then a bit representing a second logic state is transferred.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Embodiments of the invention may generally be used with any type of memory. In one embodiment, the memory may be a circuit included on a device with other types of circuits. For example, the memory may be integrated into a processor device, memory controller device, or other type of integrated circuit device. Devices into which the memory is integrated may include system-on-a-chip (SOC) devices. In another embodiment, the memory may be provided as a memory device which is used with a separate memory controller device or processor device.

In both situations, where the memory is integrated into a device with other circuits and where the memory is provided as a separate device, the memory may be used as part of a larger computer system. The computer system may include a motherboard, central processor, memory controller, the memory, a hard drive, graphics processor, peripherals, and any other devices which may be found in a computer system. The computer system may be part of a personal computer, a server computer, or a smaller system such as an embedded system, personal digital assistant (PDA), or mobile phone.

In some cases, a device including the memory may be packaged together with other devices. Such packages may include any other types of devices, including other devices with the same type of memory, other devices with different types of memory, and/or other devices including processors and/or memory controllers. Also, in some cases, the memory may be included in a device mounted on a memory module. The memory module may include other devices including memories, a buffer chip device, and/or a controller chip device. The memory module may also be included in a larger system such as the systems described above.

In some cases, embodiments of the invention may be used with multiple types of memory or with a memory which is included on a device with multiple other types of memory. The memory types may include volatile memory and non-volatile memory. Volatile memories may include static random access memory (SRAM), pseudo-static random access memory (PSRAM), and dynamic random access memory (DRAM). DRAM types may include single data rate (SDR) DRAM, double data rate (DDR) DRAM, low power (LP) DDR DRAM, and any other types of DRAM. Nonvolatile memory types may include magnetic RAM (MRAM), flash memory, resistive RAM (RRAM), ferroelectric RAM (Fe-RAM), phase-change RAM (PRAM), electrically erasable programmable read-only memory (EEPROM), laser programmable fuses, electrically programmable fuses (e-fuses), and any other types of nonvolatile memory.

FIG. 1 illustrates an exemplary system 100 according to an embodiment of the invention. As illustrated, system 100 includes a central processing unit (CPU) 110, memory 120, graphics processing unit (GPU) 130, input/output (IO) interface 140, a storage device 150, and a memory controller 160 interconnected by a bus 190.

CPU 110 may comprise one or more processor cores and one or more levels of cache memory. The one or more processor cores may be configured to execute instructions from a predetermined set of instructions. Each processor core may execute a sequence of instructions to perform one or more functions of the system, for example, text editing, displaying graphics, and the like. In one embodiment, the sequence of instructions may be performed in a pipelined manner to improve performance.

The memory 120 may be a random access memory, for example, a dynamic random access memory (DRAM), synchronous DRAM (SDRAM), double data rate synchronous DRAM (DDR SDRAM), static random access memory (SRAM), and the like, sufficiently large to hold the necessary programming and data structures operated on by CPU 110. While memory 120 is shown as a single entity, it should be understood that memory 120 may in fact comprise a plurality of modules, and that memory 120 may exist at multiple levels, for example, L2 cache, L3 cache, main memory, and the like.

Storage device 150 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 120 and storage 150 could be part of one virtual address space spanning multiple primary and secondary storage devices.

IO interface 140 may provide an interface between the processor and an input or output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 130 may be configured to receive graphics data, for example, 2-Dimensional and 3-Dimensional graphics data, from CPU 110. In one embodiment, GPU 130 may perform one or more computations to manipulate the graphics data, and render images on a display screen using, for example, IO interface 140.

Memory controller 160 may be configured to manage the flow of data to and from memory 120 and/or the storage device 150. For example, memory controller 160 may be configured to receive data read and/or data write requests from one of the CPU 110, GPU 130, and/or IO interface 140. In response to receiving the requests, memory controller 160 may be configured to perform a read or write access to one of the memory 120 and/or storage device 150. While memory controller 160 is illustrated as a separate system device in FIG. 1, in alternative embodiments, memory controller 160 may be integrated with another device, for example, CPU 110.

Data may be exchanged between the various system devices, for example, between memory controller 160 and memory 120, over the bus 190. While the devices of system 100 are shown connected by a single bus 190, in alternative embodiments, one or more busses may be provided to connect one or more of the system devices. For example, in one embodiment, a first bus may connect CPU 110 to the memory controller 160, and a second bus may connect the memory controller to the memory 120.

Bus 190 may include a plurality of parallel conductive lines for transferring a plurality of bits of data. Improving performance of the system 100 may involve operating the system at a higher clock speeds. Alternatively, or additionally, the bus 190 may be widened to include more conductive lines, thereby increasing the amount of data transferred in parallel between system devices. However, increasing the clock speed and/or widening bus 190 may result in increased power consumption by the bus 190, which may be undesirable.

Power may be consumed on each conductive line of the bus 190 provided to drive a bit value from one device to another, for example, from memory controller 160 to memory 120. The bit value may be associated with one of a plurality of logic states. For example, in a binary system, the bit value may be represented by one of a "logic 0" bit or "logic 1" bit. Different voltage and/or current values may be associated with driving bits different logic states, thereby allowing devices to differentiate between different logic states. Because different logic states are associated with different voltages and/or currents, it follows that different amounts of power may be necessary for driving bits of different logic states on bus 190.

In one embodiment, driving logic 0 bits on a data line of bus 190 may require a greater amount of power than driving logic 1 bits. In a system where the data bus 190 is widened to improve performance, it is possible that a majority of the data lines may drive logic 0 bits, thereby increasing power consumption. Accordingly, it may be more desirable to transfer logic 1 bits on data bus 190 rather than logic 0 bits in order to conserve power.

Another problem associated with transferring data between devices at high clock speeds is that switching from one logic state to another on a data line may generate noise or require additional power. For example, a particular data line of bus 190 may transfer a first bit representing a logic 1. In a subsequent transmission, the data line may transfer a second bit representing a logic 0. Because driving different logic states require different amounts of power, toggling between logic states on a data line may require additional power. Furthermore, at high clock speeds, such toggling may generate noise that may result in erroneous transmissions. Accordingly, it is desirable to minimize the toggling of bits on the data lines of bus 190.

To reduce power consumption and noise on the bus 190, in one embodiment of the invention, a value transmitted on a conductive line of bus 190 may be derived based on a comparison of a current bit and an immediately previous bit associated with the conductive line. For example, in a particular embodiment, each conductive line of the bus may be configured to transmit a logic 1 bit if a previous bit is the same as the current bit, and transmit a logic 0 bit if the previous bit is different from the current bit. Deriving a bit value for each conductive line based on a comparison of a current bit and an immediately previous bit may obviate the need for an additional conductive line to transfer a DBI enable signal. Furthermore, in systems where substantially similar consecutive bytes are transmitted, embodiments of the invention may substantially reduce the number of logic 0 bits transmitted.

Figure 2:
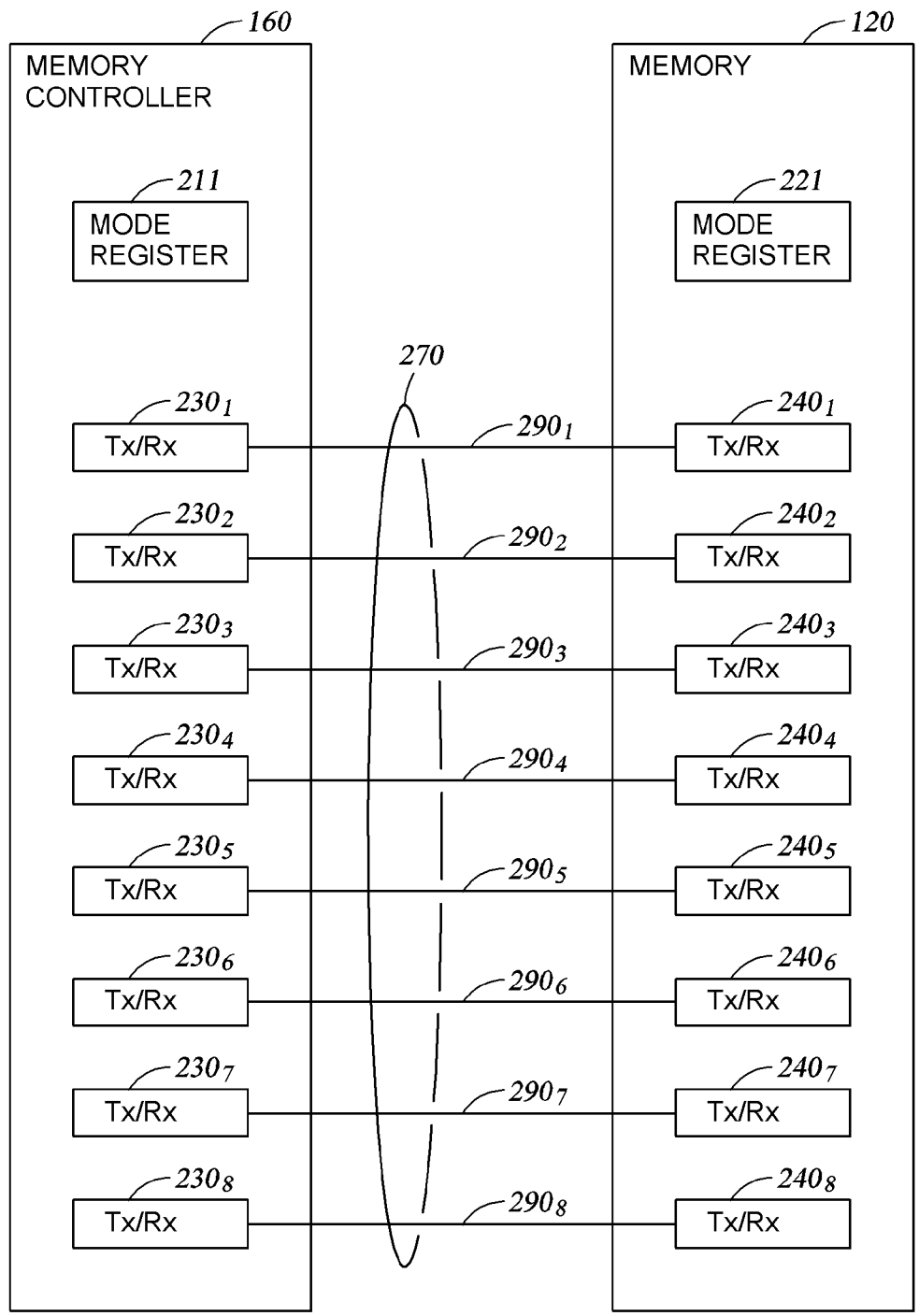
FIG. 2 illustrates a more detailed view of two interconnected devices, according to an embodiment of the invention.

FIG. 2 illustrates a more detailed view of two devices connected by an exemplary bus 290. For purposes of illustration the devices illustrated herein are a memory controller 160 to a memory 120. However, embodiments of the invention are not limited to memory controllers and memory devices. More generally, any two devices interconnected by a bus fall within the purview of the invention.

For simplicity, bus 290 is shown comprising eight conductive lines $290_1$-$290_8$. In alternative embodiments, any number of conductive lines may be included in the bus 290. In one embodiment, the bus 290 may include a control bus, address bus and/or a data bus. A control bus may be used to exchange control signals, for example, write enable, chip select, data available, and the like. The address bus may be configured to transfer an address representing a memory location for storing or retrieving data. The data bus may be configured to transfer data to and from identified memory locations. In one embodiment of the invention, one or more conductive lines of memory bus 290 may be configured to transfer control bits, address bits and/or data bits.

As illustrated in FIG. 2, the memory controller 160 may contain a plurality of transceiver circuits 230 connected to each conductive line of bus 490. Memory 120 also comprises a plurality of transceiver circuits 240 connected to each conductive line of bus 290, as illustrated. While transmitting a plurality of bits over the bus 290, each of the transceiver circuits 230 and 240 may be configured to receive a respective bit, determine a derived output bit based on an immediately previously transmitted bit, and transmit the derived output bit over a respective conductive line of bus 290. While receiving transmitted data, each of the transceiver circuits 230 and 240 may be configured to receive a bit value from a respective conductive line of bus 290 and output a derived bit value based on the received value.

In one embodiment of the invention, transceiver circuits 230 and 240 may be configured to transmit a default logic bit value if successive bit values for a particular conductive line do not change. In a particular embodiment, the default logic bit value may be logic 1 because logic 1 bits may consume less power during transmission in comparison to logic 0 bits. However, in alternative embodiments, the default logic bit value may be logic 0. If the default logic bit value is logic 1, each transceiver circuit 230 and 240 may be configured to transmit a logic 1 (the default logic bit value) over bus 290 if an immediately previous bit value is the same as a current bit value. However, if the immediately previous bit value is different from the current bit value, each transceiver circuit 230 and 240 may be configured to transmit a logic 0 bit. Therefore, logic 0 bits are only transmitted when a current bit is different from an immediately previous bit on a given data bus line.

For example, in a first transmission, transceiver $230_1$ of memory controller 160 may receive a logic 0 bit for transmission. In an immediately subsequent second transmission, transceiver $230_1$ may again receive a logic 0 bit for transmission. Because the bit value does not change between the first transmission and the second transmission, transceiver $230_1$ may be configured to transmit the default logic bit (logic 1, in one embodiment) over the conductive line $290_1$ of bus 290 during the second transmission. However, if a logic 1 bit is received for the second transmission, transceiver $230_1$ may be configured to transmit a logic 0 bit because the bit value changes between the first transmission and the second transmission.

In one embodiment of the invention, memory controller 160 and memory 120 may each contain a same initial condition value, wherein the initial condition value may provide an immediately previously transmitted bit value for each of the transceivers 230 and 240 for a first transmission after startup and/or reset of the memory controller 160 and memory 120. In a particular embodiment, the initial condition value may be logic 1. In one embodiment, the initial value may be stored in a mode register in each of memory controller 160 and memory 120, for example, in mode registers 211 and 221, respectively. Alternatively, memory controller 160 may be configured to communicate the initial condition value to the memory controller during startup or reset.

Figures 3, 4:
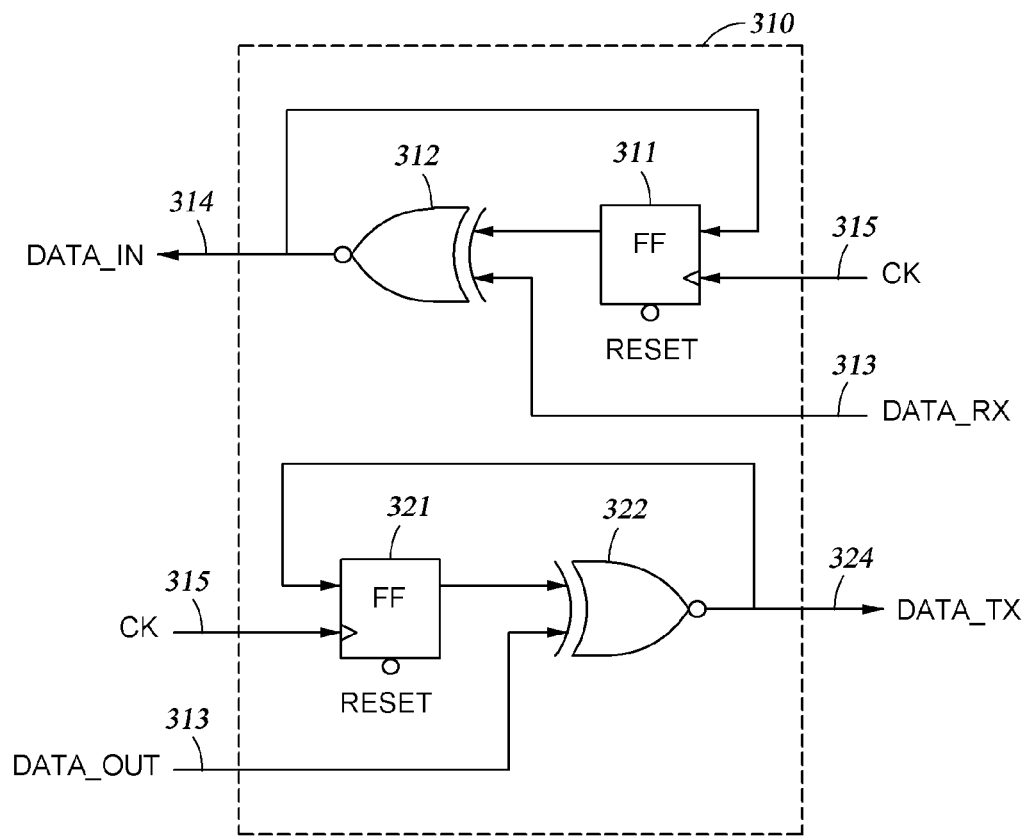
FIG. 3 illustrates a transceiver, according to an embodiment of the invention.
FIG. 4 illustrates a table comprising XOR gate logic according to an embodiment of the invention.

FIG. 3 illustrates a more detailed view of a transceiver 300 according to an embodiment of the invention. Transceiver 300 may correspond to either transceiver 230 or 240 illustrated in FIG. 2. As illustrated in FIG. 3, transceiver 300 may include a receiver circuit 310 and a transmitter circuit 320.

Transmitter circuit 320 may include a flip flop 321 and an XOR gate 322. An input 323 of the transmitter circuit 320 may be coupled with an input of the flip flop 321 and a first input of the XOR gate 322, as illustrated in FIG. 3. Furthermore, an output of the flip flop 321 may be coupled with a second input of the XOR gate 322.

Flip flop 321 may be configured to store a data bit received via the input 323 so that the received data bit is available for comparison with next data bit received on the input 323. For example, a first received data bit may be stored in the flip flop 321. Next, a second data bit may be received for transmission. The second data bit may be received by the XOR gate 322 via the first input. Furthermore, the first bit stored in flip flop 321 may be received by the XOR gate 322 via the second input.

XOR gate 322 may compare the second bit with the first bit and generate a derived bit at an output 324 of the transmitter circuit 320. The output 324 may be coupled with one of the conductive lines of a data bus, for example, data bus 290 of FIG. 2.

FIG. 4 illustrates the logic of the XOR gate 322 according to an embodiment of the invention. As illustrated in FIG. 4, if a previous bit is the same as an immediately subsequent current bit, the derived bit value is logic 1. However, if the previous bit is different from an immediately subsequent current bit, the derived bit value is logic 0. Therefore, transmitter circuit 320 may be configured to transmit a logic 0 when the previous bit is different from an immediately subsequent current bit.

Referring back to FIG. 3, receiver circuit 310 may include a flip flop 311 and an XOR gate 312. An input 313 of the receiver circuit 310 may be coupled with an input of the flip flop 311 and a first input of the XOR gate 312, as illustrated in FIG. 3. Furthermore, an output of the flip flop 311 may be coupled with a second input of the XOR gate 312.

Input 313 of the receiver circuit 310 may be coupled with a conductive line of a bus, for example, bus 290 illustrated in FIG. 2. Flip flop 311 may be configured to store a data bit received via the input 313 so that the received data bit is available for comparison with an immediately subsequently received data bit, i.e., the next bit received on the input 313. For example, a first received data bit may be stored in the flip flop 311. Immediately subsequently, a second data bit may be received. The second data bit may be received by the XOR gate 312 via the first input. Furthermore, the first bit stored in flip flop 311 may be received by the XOR gate 312 via the second input. XOR gate 312 may compare the second bit with the first bit and generate a derived bit at an output 314 of the receiver circuit 310. XOR gate 312 may use the same logic illustrated in FIG. 4 to generate the derived bit at output 314.

The flip flops 311 and 321 are also shown including a clock input 315. Clock input 315 may provide a clock signal to the flip flops 311 and 321 to synchronize communication between devices on the bus. Each of flip flops 311 and 321 may also include a reset input to receive a reset signal. The reset signal may be configured to set a value stored in the flip flop to an initial condition. Initial conditions are described in greater detail below. A reset signal may be asserted, for example, during start up, restart, interrupt, etc. of the system.

Figure 5:
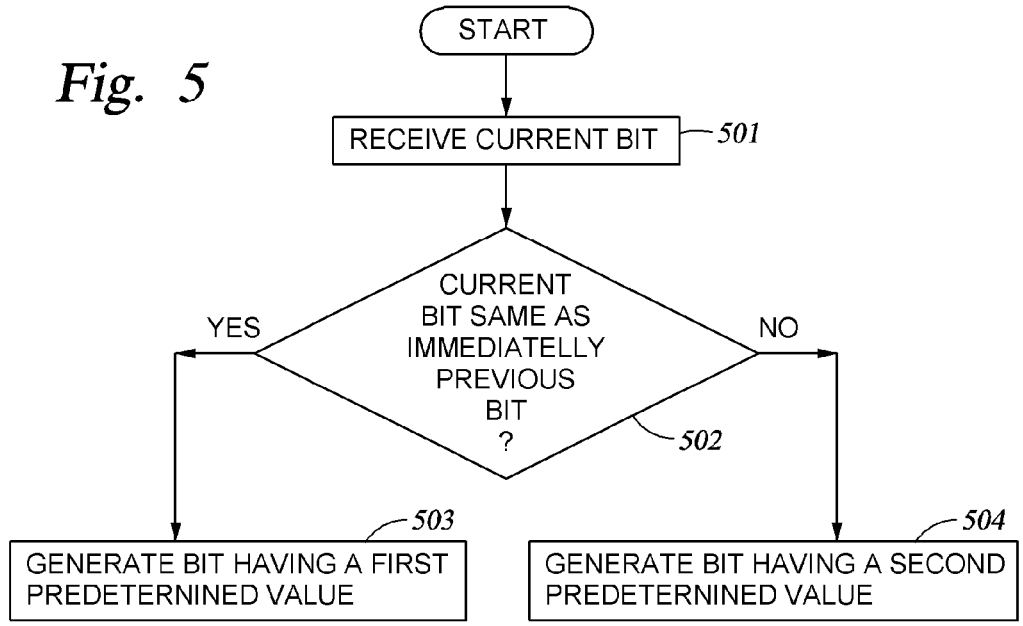
FIG. 5 is a flow diagram of exemplary operations performed by a transceiver according to an embodiment of the invention.

FIG. 5 illustrates exemplary operations performed by a transmitter circuit and/or a receiver circuit to generate a derived output based on a current bit and an immediately previously received bit. The operations begin in step 501 by receiving a current bit. In step 502, the current bit may be compared with an immediately previously received bit. If the current bit is the same as the immediately previously received bit, then the transmitter and/or receiver circuit may generate a bit having a first predetermined value in step 503. In one embodiment, the first predetermined value is logic 1.

On the other hand, if the current bit is different from the immediately previously received bit, then the transmitter and/or receiver circuit may be configured to generate a bit having a second predetermined value in step 504. In one embodiment of the invention, the second predetermined value may be logic 0.

In one embodiment of the invention, data bus inversion Direct Current (hereinafter referred to as DBI DC) and/or data bus inversion Alternating Current (hereinafter referred to as DBI AC) inversion may be performed on derived output bits from the plurality of transceivers 230 and 240. Data bus inversion may allow further reduction in power consumption on a bus connecting two devices. The DBI DC method may involve comparing a plurality of parallel bits transferred over the data bus 190 to a reference logic state. For example, in an exemplary embodiment, data bus 190 may include eight parallel data lines configured to transfer eight parallel bits of data at a time. Each of the eight parallel bits of data may be one of logic state 0 or logic state 1.

Figure 6:
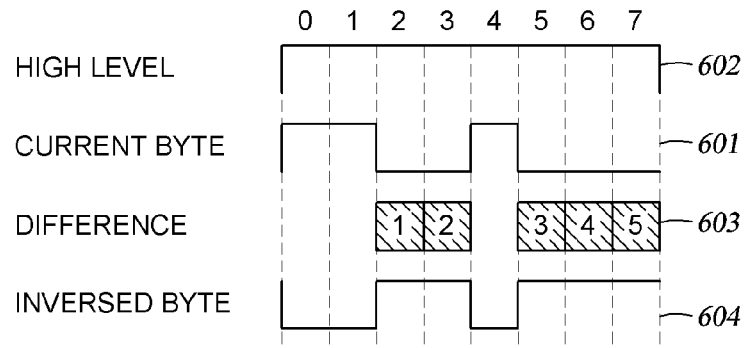
FIG. 6 illustrates data bus inversion direct current (DBI DC) according to an embodiment of the invention.

In one embodiment, the plurality of parallel bits may be compared to a reference logic state to determine a number of bits (of the parallel bits) of a particular logic state. FIG. 6 illustrates DBI DC according to an embodiment of the invention. As illustrated in FIG. 6, a current byte 601 (bits 0-7) may include eight bits, each of which are one of logic 0 or logic 1. The current byte 601 may represent derived bits generated by the transceivers 230 and/or 240. Particularly, in current byte 601 illustrated in FIG. 6, bits 0, 1, and 4 are logic 1, and bits 2, 3, and 5-7 are logic 0.

Each of the bits of current byte 601 may be compared to a reference logic state. For example, current byte 601 may be compared to the high level byte (logic 1) 602 to determine the number of logic 0 bits. In a particular embodiment, the number of logic 0 bits may be determined by subtracting the current byte 601 from the high level byte 602. The difference 603 between high level byte 602 and current byte 601 is illustrated in FIG. 6. The difference 603 indicates that there are five logic 0 bits in the current byte 601. Because the logic 0 bits represent a majority of the plurality of bits (i.e., greater than 4, in this case), the plurality of data bits may be inverted to conserve power. In other words, as discussed earlier, driving logic 0 bits may consume more power. Accordingly, in one embodiment, if a majority of the plurality of data bits are logic 0 bits, the plurality of data bits may be inverted to reduce the number of logic 0 bits, thereby further conserving power.

FIG. 6 illustrates inversed byte 604 after DBI DC inversion. As illustrated, bits 0, 1, and 4 are logic 0 and bits 2, 3, and 5-7 are logic 1. Because a majority of bits of inversed byte 604 are logic 1 bits, relatively lower power will be required to transfer inversed byte 604. If, on the other hand, it is determined that the majority of bits are not logic 0, the current byte 601 may not be inversed. While logic 0 states are described as consuming greater power during transmission, one skilled in the art will recognize that the inverse may be true. In other words, in other embodiments, transmitting logic 1 bits may consume greater power. Accordingly, the DBI DC method may be adapted to reduce the number of logic 1 bits transmitted using steps similar to the ones described above.

Furthermore, while a comparison of the current byte with a high level logic 1 reference byte is disclosed in FIG. 6, embodiments of the invention are not so limited. In alternative embodiments, the current byte 601 may be compared with a logic 0 reference byte to determine a number of bits of a particular logic state.

Figure 7:
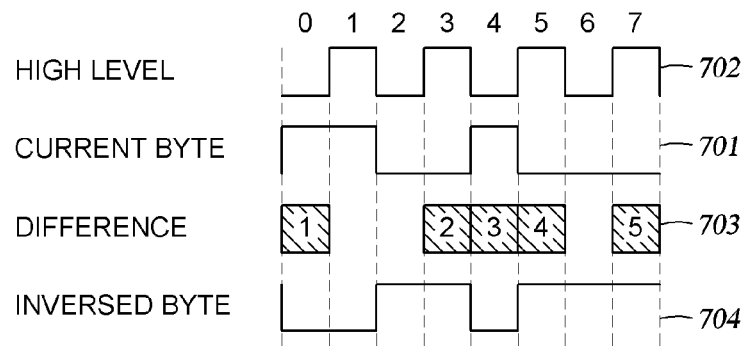
FIG. 7 illustrates data bus inversion alternating current (DBI AC) according to an embodiment of the invention.

Another data bus inversion technique is the DBI AC method, which may involve comparing a current byte to an immediately previously transmitted byte. FIG. 7 illustrates DBI AC according to an embodiment of the invention. As illustrated in FIG. 7 a current byte 701 (bits 0-7) may include eight bits, each of which are one of a logic state 0 or logic state 1. Illustratively, in current byte 701, bits 0, 1, and 4 are logic 1, and bits 2, 3, and 5-7, are logic 0.

Each of the bits of current byte 701 may be compared to the immediately previously transmitted byte 702 by a comparison circuit of the device (not shown in Figures). Bits 1, 2, 4, and 6 of previous byte 702 in FIG. 7 are logic 0, while bits 1, 3, 5, and 7 are logic 1. The previous byte 702 may be compared to the current byte 701 to determine a number of bits that are toggled in current byte 701 with respect to previous byte 702. In a particular embodiment, the current byte 701 may be subtracted from the previous byte 702 to determine the number of toggled bits.

Toggling a bit, as described herein, generally refers to changing a bit value driven on a particular bit line of a bus. For example, each device of a system connected to a bus may include one or more drive circuits configured to drive a bit value on a particular bit line of a system bus. In a first transmission, the drive circuits may drive a first bit value, for example, a logic 0 bit. If a subsequently driven bit value is different from an immediately previously driven bit, for example, logic 1, the drive circuits may have to be reconfigured to drive the different bit.

Referring to FIG. 7, the difference 703 between previous byte 702 and current byte 701 indicates that five current byte 701 bits that have to be toggled to match previous byte 702. Particularly, bits 0, 3-5, and 7 will have to be toggled, as illustrated. Because a majority of the plurality of bits (i.e., greater than 4, in this case), will have to be toggled, the plurality of data bits may be inverted to conserve power and reduce noise. In other words, because toggling bits on a data line may increase consumption of power and generate noise, the DBI AC method is used to minimize the number of bits that need to be toggled. Accordingly, if a majority of the plurality of data bits need to be toggled, the plurality of data bits may be inverted to conserve power and reduce noise.

FIG. 7 illustrates inversed byte 704 after DBI AC inversion. As illustrated, bits 0, 1, and 4 are logic 0 and bits 2, 3, and 5-7 are logic 1. Therefore, only 3 bits of the previous byte (1, 2, and 6) will need to be toggled to derive the inversed byte 704.

In one embodiment, in addition to a plurality of conductive lines to transfer data, data bus 190 may include a conductive line configured to transfer a DBI enable signal to indicate, to a device receiving data, that the received data has been inversed. However, adding an additional conductive line may increase the number of zeroes transmitted over the bus 190 and increase power consumption.

FIG. 8 is an exemplary table 800 illustrating exemplary derived bits and DBI DC analysis of the derived bits. Column 810 illustrates exemplary bits received by a four transceivers of a system device. The bits may be bits received by the transceivers for transmission on to a bus or bits received from the bus. Column 850 illustrates the received bits in 850 after DBI DC inversion. Column 820 of table 800 illustrates derived bits for each corresponding received bit. Column 830 of table 800 illustrates the derived bits after DBI DC inversion.

Column 820, Row 841 illustrates an initial value that may be stored for example in a mode register of a device comprising the transceiver. For purposes of simplicity, a bus width of 4 and an initial condition of '0000' is assumed. While an initial condition of '0000' is illustrated in FIG. 8, in alternative embodiments, an initial condition of '1111' may be used. As discussed earlier, in some embodiments, transferring logic 1 bits may consume less power than transferring logic 0 bits. Accordingly, in some embodiments, implementing an initial condition of '1111' may result in additional power savings.

Column 810, Row 842, of Table 800 illustrates a first value '0100' associated with a first transmission received by the transceivers. Column 850 illustrates DBI DC inversion of the received bits '0100'. Because a majority of the bits are logic 0, the received bits are inverted to '1011', as illustrated in Column 850, row 842. Furthermore, a DBI enable bit may be asserted to indicate that the received bits are inverted. In one embodiment of the invention, the enable bit may be set to logic 0 to indicate inversion. However, alternatively the enable bit may be set to logic 1 to indicate inversion.

The transceivers may compare the first value '0100' with the initial value '0000' and derive a value '1011' based on the method described above. Furthermore, because a majority of bits of the value '1011' are logic 1 bits, the bits may not be inverted during DBI DC inversion, as can be seen in Column 830, Row 841. Accordingly, an enable bit may be set to logic 1 to indicate that the derived bits are not inverted, as shown in Column 830.

The transceivers may receive a second value '0100' for a second transmission immediately following the first transmission as can be seen in Column 810, Row 843. Again DBI DC analysis of '0100' results in inversion of the bits to '1011' and the setting of a DBI enable bit to logic 0, as shown in Column 850. Because the second value is the same as the first value, the derived bits for the second transmission may be '1111' as can be seen in Column 820, Row 843. Furthermore, because a majority of the derived bits are logic 1 bits, the derived bits may not be inverted based on DBI DC.

The transceivers may receive a third value '0110' for a third transmission immediately following the second transmission. DBI DC analysis of '0110' does not require inversion because a majority of the bits are not logic 0. Accordingly, the DBI enable bit is set to logic 1, as shown in Column 850. Because one bit of the third value is different from a corresponding bit of the second value, the derived bits for the third transmission may be '1101'. Again, because a majority of the derived bits are logic 1 bits, the derived bits may not be inverted based on DBI DC.

The transceivers may receive a fourth value '1000' for a fourth transmission immediately following the third transmission. DBI DC analysis of '1000' results in inversion of the bits to '0111' and the setting of a DBI enable bit to logic 0, as shown in Column 850. Because three bits of the fourth value are different from corresponding bits of the third value, the derived bits for the fourth transmission may be '0001'. Furthermore, because a majority of the bits are logic 0 bits, the derived bits may be inverted to '1110' as can be seen in Column 830, Row 845. Furthermore, an enable bit may be set to logic 0 to indicate that the derived bits are inverted, as shown in column 830.

The transceivers may receive a fifth value '1100' for a third transmission immediately following the second transmission. DBI DC analysis of '1100' does not require inversion. Accordingly, the DBI enable bit is set to logic 1, as shown in Column 850. Because one bit of the third value is different from a corresponding bit of the second value, the derived bits for the third transmission may be '1101'. Because a majority of the derived bits are logic 1 bits, the derived bits may not be inverted based on DBI DC.

The transceivers may receive a sixth value '1110' for a third transmission immediately following the second transmission. DBI DC analysis of '1110' does not require inversion. Accordingly, the DBI enable bit is set to logic 1, as shown in Column 850. Because one bit of the third value is different from a corresponding bit of the second value, the derived bits for the third transmission may be '1101'. Again, because a majority of the derived bits are logic 1 bits, the derived bits may not be inverted based on DBI DC.

The transceivers may receive a seventh value '1111' for a third transmission immediately following the second transmission. DBI DC analysis of '1111' does not require inversion. Accordingly, the DBI enable bit is set to logic 1, as shown in Column 850. Because one bit of the third value is different from a corresponding bit of the second value, the derived bits for the third transmission may be '1110'. Because a majority of the derived bits are logic 1 bits, the derived bits may not be inverted based on DBI DC.

Comparing the total number of bits in columns 810, 820, 830, and 850, the advantages of embodiments of the invention become more apparent. For example, the number of logic 0 bits transmitted using derived bits (8 bits in total) is lower than the number of logic 0 bits in the received bits (14 in total) and the number of logic 0 bits after DBI DC inversion of the received bits (11 bits in total). Furthermore, comparing derived bits to DBI DC inversion of the received bits, a separate conductive line to transmit a DBI DC enable bit is also avoided.

Comparing the number of logic 0 bits in columns 820 to the number of logic 0 bits in column 830 illustrates the advantages of performing DBI analysis on the derived bits. Specifically, the number of logic 0 bits may be further reduced (in this case from 8 to 7), even with the addition of a separate conductive line for transmitting a DBI enable signal.

Embodiments of the invention may be particularly advantageous in systems wherein successively transmitted groups of bits are substantially similar. For example, while transmitting screen pixel information stored in memory, it is highly likely that adjacent screen pixels have the same color. Therefore, transmitting values associated with adjacent pixels may significantly reduce the number of logic 0's transmitted over the system bus.

Embodiments of the invention may also be advantageous while stepping through and executing instruction code stored in memory. Stepping through instruction code may involve accessing adjacent memory locations. Because the address bits for adjacent memory locations may be substantially the same, accessing adjacent memory locations may reduce the transmission of logic 0's on an address bus.

FIG. 9 illustrates exemplary data, for example, screen pixel data that may be transferred on a bus. Because adjacent pixels on a screen are likely to be the same color, pixel values serially transferred over a bus may have substantially similar bits, as can be seen in the received bits column 910 in FIG. 9. As a result successive bits transferred on each conductive line may also be substantially the same. Therefore, the likelihood of transferring logic 1 bits using the derived logical output method described above is greatly increased. For example, comparing the received bits in column 910 to the transferred derived bits in column 920, it can be seen that the total number of logic 0 bits is reduced significantly from 32 to 5.

Therefore, by transmitting bits derived based on immediately previously transmitted bits on a bus, embodiments of the invention may reduce power consumption and noise.

While the foregoing is directed to embodiments of the present invention, other and further embodiments of the invention may be devised without departing from the basic scope thereof, and the scope thereof is determined by the claims that follow.

What is claimed is:

1. A method of communication between a first device and a second device over an interconnect bus comprising:

transferring a plurality of bit codes associated with a plurality of bits across a plurality of conductive lines, wherein each bit code is transferred on a respective conductive line, and wherein, before transferring the plurality of bit codes, each bit is assigned a bit code by:

assigning a first default initial bit value to a first immediately previously received bit associated with the first device;

assigning a second default initial bit value to a second immediately previously received bit associated with the second device;

receiving one of the plurality of bits for transfer from the first device to the second device;

after assigning the first default initial bit value to the first immediately previously received bit, determining whether a value of the one bit is the same as a value of the first immediately previously received bit, the one bit and the first immediately previously received bit being associated with the respective conductive line of the interconnect bus;

if the value of the first immediately previously received bit is the same as the value of the one bit, assigning a first bit code to the respective conductive line;

if the value of the first immediately previously received bit is not the same as the value of the one bit, assigning a second bit code to the respective conductive line, wherein the first bit code is different from the second bit code;

determining whether a majority of the assigned bit codes for the plurality of bits are the second bit code; and if so, inverting each assigned bit code before transmitting the assigned bits codes across the plurality of conductive lines.

2. The method of claim 1, further comprising:

receiving, at the second device, a first bit from the respective conductive line, the first bit being one of the first bit code and the second bit code;

determining whether a code of the first bit is the same as a value of the second immediately previously received bit received from the respective conductive line;

if the value of the second immediately previously received bit is the same as the code of the first bit, generating a first bit value; and if the value of the second immediately previously received bit is not the same as the code of the first bit, generating a second bit value.

3. The method of claim 1, wherein the first device is one of a memory controller and a memory device.

4. The method of claim 1, wherein the second device is one of a memory controller and a memory device.

5. The method of claim 1, further comprising:

if the assigned bit codes for the plurality of bits have been inverted, transferring a flag bit to indicate that the assigned bit codes have been changed.

6. The method of claim 1, before assigning the initial bit value of the second immediately previously received bit and before transferring the plurality of bit codes, transmitting the first default initial bit value of the first immediately previously received bit across the plurality of conductive lines from the first device to the second device, wherein the second device assigns the second default initial bit value of the second immediately previously received bit to the first default initial bit value of the first immediately previously received bit.

7. The method of claim 6, wherein the first default initial bit value of the first immediately previously received bit is transmitted from the first device to the second device upon detecting that at least one of the first device and second device is powered on or after a reset.

8. The method of claim 1, wherein the first bit code is a logic 1 and the second bit code is a logic 0, and wherein each of the plurality of the conductive lines requires more power to transfer the logic 0 than to transfer the logic 1.

9. A transceiver comprising a transmitter comprising:

a first means for receiving a plurality of bits for transfer from a first device to a second device via a plurality of conductive lines coupling the first device and second device, wherein each bit is transferred on a respective conductive line, the first means, before transferring the plurality of bit codes, assigns first default initial bit values to first immediately previously received bits associated with the first device, wherein the first default initial bit values of the first immediately previously received bits are the same as second default initial bit values assigned to second immediately previously received bits associated with the second device;

a second means for determining, after the first default initial bit values of the first immediately previously received bits have been assigned, whether values of the plurality of bits are the same as values of the first immediately previously received bits on the same respecitive conductive line; and a third means for assigning a bit code to the plurality of bits by transferring a first bit code if the value of the first immediately previously received bit transferred on the respective conductive line is the same as the value of the bit and transferring a second bit code to the respective conductive line if the value of the first immediately previously received bit transferred on the respective conductive line is not the same as the value of the bit, wherein the first bit code is different from the second bit code, and wherein if a majority of the assigned bit codes for the plurality of bits are the second bit code, each assigned bit code is inverted before transmitting the assigned bits codes across the plurality of conductive lines.

10. The transceiver of claim 9, further comprising a receiver comprising:

a fourth means for receiving a first bit from the respective conductive line;

a fifth means for determining whether a code of the first bit is the same as the a value of a second bit, the second bit being received from the respective conductive line immediately previous to the first bit; and a sixth means for generating a first bit value if the value of the second bit is the same as the code of the first bit and generating the second bit value if the value of the second bit is not the same as the code of the first bit.

11. The transceiver of claim 9, wherein the first device is one of a memory controller and a memory device.

12. The transceiver of claim 9, wherein the second device is one of a memory controller and a memory device.

13. The transceiver of claim 9, wherein, before determing whether values of the plurality of bits are the same as values of the first immediately previously received bits, the first means transmits the first default initial bit values of the first immediately previously received bits across the plurality of conductive lines from the first device to the second device, and wherein the first bit code is a logic 1 and the second bit code is a logic 0, and wherein each of the plurality of the conductive lines requires more power to transfer the logic 0 than to transfer the logic 1.

14. A system, comprising:
a first device;
a second device;
an interconnect bus coupled to the first device and a second device, wherein each of the first device and the second device includes transceivers associated with each conductive line of the interconnect bus, the transceivers comprising transmitter circuits configured to:
initialize the first and second devices by assigning a first default initial bit value to an immediately previously received bit associated with each transceiver;
receive a bit;
after assigning the first default initial bit value, determine whether a value of the bit is the same as a value of the immediately previously received bit;
if the value of the immediately previously received bit is the same as the value of the bit, assign a first bit code to a first conductive line associated with the transceiver;
if the value of the immediately previously received bit is not the same as the value of the bit, assign a second bit code to the first conductive line, wherein the first bit code is different from the second bit code;
determine whether a majority of the assigned bit codes for a plurality of bits are the second bit code;
if so, inverting each assigned bit code; and
transfer the assigned bit codes.

15. The system of claim 14, wherein the transceiver further comprises a receiver circuit configured to:
receive a first bit from the first conductive line;
determining whether a code of the first bit is the same as the a value of a second bit, the second bit being received from the first conductive line immediately previous to the first bit;
if the value of the second bit is the same as the code of the first bit, generating a first bit value; and
if the value of the second bit is not the same as the code of the first bit, generating a second bit value.

16. The system of claim 14, wherein the first device is one of a memory controller and a memory device.

17. The system of claim 14, wherein the second device is one of a memory controller and a memory device.

18. The system of claim 14, wherein a first one of the transceivers associated with the first device transmits the first default initial bit value of the immediately previously received bit to a second one of the transceivers associated with the second device, and wherein the first bit code is a logic 1 and the second bit code is a logic 0, and wherein the interconnect bus requires more power to transfer the logic 0 than to transfer the logic 1.

19. A method for reducing power consumption on a bus coupling at least a first device and a second device, comprising:

initializing the first device by assigning a first default initial bit value of a first immediately previously received bit associated with the first device;
initializing the second device by assigning a second default initial bit value of a second immediately previously received bit asscoiated with the second device;
after assigning the first default initial bit value to the first immediately previously receive bit, on each conductive line of the bus, assigning a first bit code on the conductive line if a current bit received for transfer on the conductive line is the same as the first immediately previously received bit;
assigning a second bit code on the conductive line if the current bit received for transfer on the conductive line is not the same as the first immediately previously received bit;
determining whether, for a plurality of bit codes, a majority of the plurality of the bit codes are assigned to the second bit code; and
if so, inverting each bit code to be driven before transmitting the first and second bit codes on the bus.

20. The method of claim 19, further comprising receiving a bit from a first conductive line of the bus on the second device, generating a first bit value if the code of the bit is the same as a value of the second immediately previously received bit, and generating a second bit value if the code of the bit is not the same as the value of the second immediately previously received bit.

21. The method of claim 19, wherein the first device is one of a memory controller and a memory device.

22. The method of claim 19, wherein the second device is one of a memory controller and a memory device.

23. The method of claim 19, wherein, before assigning the second default initial bit value of the second immediately previously received bit, transmitting the first default initial bit value of the first immediately previously received bit from the first device to the second device, wherein the first and second default initial bit values for the first and second immediately previously received bits are the same, and
wherein the first bit code is a logic 1 and the second bit code is a logic 0, and wherein the bus requires more power to transfer the logic 0 than to transfer the logic 1.

24. A system, comprising:
a first device;
a second device; and
a bus coupling the first device and second device;
wherein:
the first device is configured to store a plurality of last bits transferred to the second device on respective conductive lines of the bus and drive a signal over the bus to the second device at a signal level selected from one of a first level corresponding to a first bit code and a second level corresponding to a second bit code based on a comparison between a plurality of current bits to be transferred to the second device and the plurality of last bits transferred to the second device, wherein the first device assigns, during initialization, a first default initial value to the plurality of last bits before driving the signal over the bus,
wherein, for each conductive line, if a last bit transferred is the same as a current bit then the first bit code is transferred, and wherein, for each conductive line, if the last bit transferred is different than the current bit then the second bit code is transferred,
wherein driving the signal at the first level consumes less power than driving the signal at the second level and wherein the signal level for each of the plurality of the bits is switched if a majority of the plurality of bits are assigned to the second bit code; and the second device is configured to receive the signal from the first device, generate a first bit value if the signal level corresponds to a bit code that is the same value of a last received bit, and generate a second bit value if the signal level corresponds to the bit code that is different from the value of the last received bit, wherein the second device assigns, during initialization, a second default initial value to the last received bit before generating the first bit value or the second bit value based on the received signal from the first device.

25. The system of claim 24, wherein, before the second device assigns the second default initial value to the last received bit, the first device transmits the first default initial value of the plurality of last bits over the bus to the second device, wherein the first default initial value of the plurality of last bits is the same as the second default initial value of the last received bit, and wherein the first bit code is a logic 1 and the second bit code is a logic 0, and wherein the bus requires more power to transfer the logic 0 than to transfer the logic 1.

26. The system of claim 24, wherein the second device comprises:

selecting logic that outputs the first and second bit values ; and a clock-synchronized memory storage element, wherein the output of the selecting logic is coupled to the input of the memory storage element, wherein the selecting logic comprises a first input coupled to one of the conductive lines and a second input coupled to an output of the memory storage element.

* * * * *